(12) United States Patent
Han et al.

(10) Patent No.: US 9,914,495 B2
(45) Date of Patent: Mar. 13, 2018

(54) ELECTRONIC DOCKING VEHICLE

(71) Applicant: Hyundai Motor Company, Seoul (KR)

(72) Inventors: Jong Wook Han, Seoul (KR); Seong Youn Kwak, Hwaseong-si (KR); Hee Song Ham, Seoul (KR); Jeong Seok Ha, Seoul (KR)

(73) Assignee: Hyundai Motor Company, Seoul (KR)

( * ) Notice: Subject to any disclaimer, the term of this patent is extended or adjusted under 35 U.S.C. 154(b) by 312 days.

(21) Appl. No.: 14/695,947

(22) Filed: Apr. 24, 2015

(65) Prior Publication Data

US 2016/0144906 A1    May 26, 2016

(30) Foreign Application Priority Data

Nov. 25, 2014 (KR) .......................... 10-2014-0165148

(51) Int. Cl.
*B60D 1/04* (2006.01)
*B60D 1/24* (2006.01)
(Continued)

(52) U.S. Cl.
CPC ............... *B62D 53/00* (2013.01); *B60D 1/04* (2013.01); *B60D 1/242* (2013.01); *B60D 1/246* (2013.01);
(Continued)

(58) Field of Classification Search
CPC ...... B62D 53/00; B62D 63/04; B62D 47/006; B60D 1/04; B60D 1/242; B60D 1/246;
(Continued)

(56) References Cited

U.S. PATENT DOCUMENTS 1,127,584 A * 2/1915 Ferguson ................. B60D 1/04
213/76
1,246,666 A * 11/1917 Sherman ................. B60D 1/04
280/510

(Continued)

FOREIGN PATENT DOCUMENTS

DE   102011056561 A1 * 6/2013 ............. B62K 13/00
JP      5-217096 A        8/1993
(Continued)

OTHER PUBLICATIONS

Korean Office Action issued in Korean Application No. 10-2014-0165148 dated Apr. 29, 2016.
(Continued)

*Primary Examiner* — Joseph M Rocca
*Assistant Examiner* — Maurice L Williams
(74) *Attorney, Agent, or Firm* — McDermott Will & Emery LLP

(57) ABSTRACT

An electronic docking vehicle includes a vehicle body including a docking subject mechanism that docks with a first surrounding vehicle and a docking object mechanism with which a docking subject mechanism of second surrounding vehicle docks. A vehicle manipulating mechanism is provided in the vehicle body and includes a driving force generator providing a driving force to driving wheels. A steering manipulator controls a steering angle of the driving wheels. A braking manipulator generates a braking force in the driving wheels. A controller is configured to allow one vehicle to combine with the surrounding vehicle through the docking subject mechanism or the docking object mechanism.

13 Claims, 5 Drawing Sheets

(51) Int. Cl.
  *B60D 1/26* (2006.01)
  *B60D 1/48* (2006.01)
  *B60D 1/62* (2006.01)
  *B62D 47/00* (2006.01)
  *B62D 53/00* (2006.01)
  *B62D 63/04* (2006.01)
  *B62D 31/00* (2006.01)

(52) U.S. Cl.
  CPC ............... *B60D 1/249* (2013.01); *B60D 1/26* (2013.01); *B60D 1/62* (2013.01); *B62D 31/003* (2013.01); *B62D 47/006* (2013.01); *B62D 63/04* (2013.01); *B60D 1/481* (2013.01)

(58) Field of Classification Search
  CPC . B60D 1/249; B60D 1/26; B60D 1/36; B60D 1/481; B60D 1/62
  See application file for complete search history.

(56) References Cited

U.S. PATENT DOCUMENTS

| | | | | |
|---|---|---|---|---|
| 2,053,255 A * | 9/1936 | Ferguson | ............... | B60D 1/04 280/457 |
| 2,107,312 A * | 2/1938 | Thompson | ............... | B60D 1/26 119/806 |
| 2,372,043 A * | 3/1945 | Aghnides | ............... | B62D 61/00 180/10 |
| 2,552,885 A * | 5/1951 | Claud-Mantle | ........ | B60D 1/155 280/477 |
| 2,730,183 A * | 1/1956 | Svoboda | ............... | B60D 1/62 180/14.1 |
| 3,013,816 A * | 12/1961 | Isham | ............... | B60D 1/155 188/112 R |
| 3,306,477 A * | 2/1967 | Wriedt | ............... | B60P 1/52 198/300 |
| 3,578,096 A * | 5/1971 | Pearson | ............... | B60D 1/40 180/14.6 |
| 3,648,794 A * | 3/1972 | Clepper | ............... | B60D 1/64 180/14.1 |
| 3,953,055 A * | 4/1976 | Stark | ............... | B60D 1/04 280/504 |
| 4,156,551 A * | 5/1979 | Nagase | ............... | B60D 1/62 439/195 |
| 4,262,920 A * | 4/1981 | Mettetal | ............... | B62D 53/00 280/408 |
| 4,475,741 A * | 10/1984 | Conrad | ............... | A01B 59/004 138/44 |
| 5,261,687 A * | 11/1993 | Bergman | ............... | B60D 1/26 280/478.1 |
| 5,417,300 A * | 5/1995 | Shultz | ............... | B60R 19/38 180/208 |
| 2002/0175248 A1* | 11/2002 | Fox | ............... | B60D 1/36 246/2 R |
| 2007/0089633 A1* | 4/2007 | Kovac | ............... | A63G 7/00 104/53 |
| 2010/0044998 A1* | 2/2010 | Franchineau | ............ | B60D 1/36 280/491.1 |
| 2010/0062866 A1* | 3/2010 | Schnuckle | ............... | A63J 1/02 472/78 |
| 2011/0101646 A1* | 5/2011 | Sakita | ............... | B60D 1/01 280/479.1 |
| 2011/0155481 A1* | 6/2011 | Mondl | ............... | A63G 29/02 180/7.1 |
| 2011/0202212 A1 | 8/2011 | Gatten et al. | | |
| 2011/0253463 A1* | 10/2011 | Smith | ............... | B60D 1/00 180/11 |
| 2013/0151068 A1* | 6/2013 | Lee | ............... | B60K 37/02 701/36 |
| 2013/0173086 A1* | 7/2013 | Kahler | ............... | B60D 1/62 701/2 |
| 2014/0222288 A1 | 8/2014 | Lavoie et al. | | |
| 2015/0367885 A1* | 12/2015 | Bruns | ............... | B62D 13/00 280/408 |
| 2016/0016619 A1* | 1/2016 | Cervantes | ............ | B62D 47/006 180/14.2 |

FOREIGN PATENT DOCUMENTS

| | | |
|---|---|---|
| JP | 2004-058717 A | 2/2004 |
| JP | 2013205960 A | 10/2013 |
| KR | 10-1998-080854 A | 11/1998 |
| WO | 2013/176820 A2 | 11/2013 |

OTHER PUBLICATIONS

Notice of Allowance dated Nov. 14, 2016, issued in Korean patent application No. 10-2014-0165148.

* cited by examiner

ELECTRONIC DOCKING VEHICLE

CROSS REFERENCE TO RELATED APPLICATION

The present application claims the benefit of priority to Korean Patent Application Number 10-2014-0165148 filed on Nov. 25, 2014, the entire content of which application is incorporated herein for all purposes by this reference.

TECHNICAL FIELD

The present disclosure relates to an electronic docking vehicle capable of increasing energy efficiency by allowing vehicles having the same destination to be driven in a state in which they are connected integrally with each other.

BACKGROUND

Vehicles on the road travel separately even though they travel in the same direction. Therefore, each vehicle consumes fuel individually, such that the total amount of consumed fuel is high. Each driver may feel fatigue more easily when traveling, particularly a long distance, by oneself.

In addition, a demand for smaller and environmentally friendly vehicles has been increasing, and thus, single-seater vehicles have been introduced in order to satisfy individual's lifestyle. However, when the single-seater vehicles travel individually to the same destination on the road, the total amount of fuel consumption is increased. In addition, since a single driver drives the single-seater vehicle by oneself, he/she may feel fatigue easily.

Therefore, there is a need for decreasing fuel consumption and improving convenience of drivers by building up an integral driving system for vehicles driven to the same destination.

The contents described as the related art have been provided only for assisting in the understanding for the background of the present inventive concept and should not be considered as corresponding to the related art known to those skilled in the art.

SUMMARY

An aspect of the present inventive concept provides an electronic docking vehicle capable of decreasing fuel consumption and improving convenience of drivers by providing an integral driving system in individual vehicles driven to the same destination.

According to an exemplary embodiment of the present disclosure, an electronic docking vehicle includes a vehicle body having a space therein in which a driver is seated. The vehicle body includes a docking subject mechanism that docks with a first surrounding vehicle and a docking object mechanism with which a docking subject mechanism of a second surrounding vehicle docks. A vehicle manipulating mechanism is provided in the vehicle body and includes a driving force generator providing a driving force to driving wheels, a steering manipulator controlling a steering angle of the driving wheels, and a braking manipulator generating a braking force in the driving wheels. A controller is configured to perform combination of one vehicle and the surrounding vehicles through the docking subject mechanism or the docking object mechanism, and to control an operation of the vehicle manipulating mechanism to perform vehicle driving when the one vehicle is a preceding vehicle and to limit the operation of the vehicle manipulating mechanism when the one vehicle is the following vehicle.

The vehicle body may have a spherical shape, and may include a plurality of docking subject mechanisms and docking object mechanisms spaced apart from each other along an outer circumference thereof.

The docking subject mechanism may be mounted to a front side of the vehicle body, and the docking object mechanism may be mounted to a rear side of the vehicle body.

The docking object mechanism may be formed of an electromagnet which receives power to generate a magnetic force. The docking subject mechanism may include a mover moving toward the docking object mechanism when the magnetic force is generated in the docking object mechanism and a connecting coil connecting the mover to the vehicle body as being elastically deformed.

The vehicle body may further include a hook disposed at an upper side or a lower side of the docking object mechanism and rotated in a vertical direction according to a control of the controller. A connector is disposed at an upper side or a lower side of the docking subject mechanism and connected with a hook of the first surrounding vehicle.

The vehicle body may further include a damper provided at peripheries of the docking subject mechanism and the docking object mechanism to absorb impact.

The driving force generator of the vehicle manipulating mechanism may be an electric motor generating the driving force to rotate the driving wheels.

The steering manipulator of the vehicle manipulating mechanism may include a steering manipulating mechanism disposed in the space of the vehicle body to allow the driver to directly manipulate the steering angle of the driving wheels. The braking manipulator of the vehicle manipulating mechanism may include a braking manipulating mechanism connected to the steering manipulating mechanism and generating the braking force by manipulation of the driver.

The electronic docking vehicle may further include a sensor mounted to the vehicle body and collecting driving information on driving speeds of the surrounding vehicles and distances between the one vehicle and the surrounding vehicles. When a distance between the one vehicle and the second surrounding vehicle reaches a pre-stored combination enabled distance to combine the one vehicle with the second surrounding vehicle in which the one vehicle is the preceding vehicle, the controller receives vehicle information through the sensor and applies a magnetic force to the docking object mechanism to allow the one vehicle to combine with the second surrounding vehicle.

The controller may control to maintain the one vehicle at a predetermined driving speed until the combination between the one vehicle and the second surrounding vehicle are combined.

When a distance between the one vehicle and the first surrounding vehicle does not reach at the combination enabled distance to combine the one vehicle to the first surrounding vehicle in which the one vehicle is the following vehicle, the controller may increase a driving speed of the one vehicle to allow the distance between the one vehicle and the first surrounding vehicle to reach the combination enabled distance.

The electronic docking vehicle may further include a position information collector transmitting and receiving position information to and from an artificial satellite. A radio frequency (RF) transceiver wirelessly communicates with the surrounding vehicles positioned within a communication area. The controller searches a vehicle with which the one vehicle is to combine among the surrounding vehicles and combines the one vehicle with the vehicle when a combination command from the corresponding vehicle is input to the controller.

When the one vehicle combines with the surrounding vehicle, the controller may control the vehicle manipulating mechanisms of the one vehicle and the surrounding vehicles to uniformly distribute the driving force and uniformly generate the braking force for the one vehicle and the surrounding vehicles.

DETAILED DESCRIPTION

Hereinafter, an electronic docking vehicle according to exemplary embodiments of the present inventive concept will be described with reference to the accompanying drawings.

Figure 1:
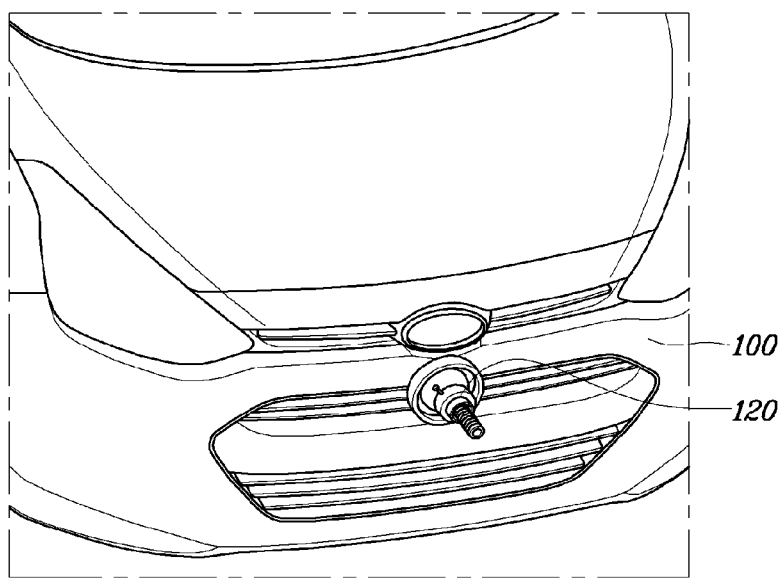
FIGS. 1 and 2 are views for describing a docking subject mechanism and a docking object mechanism according to an exemplary embodiment of the present inventive concept.
Figure 2:
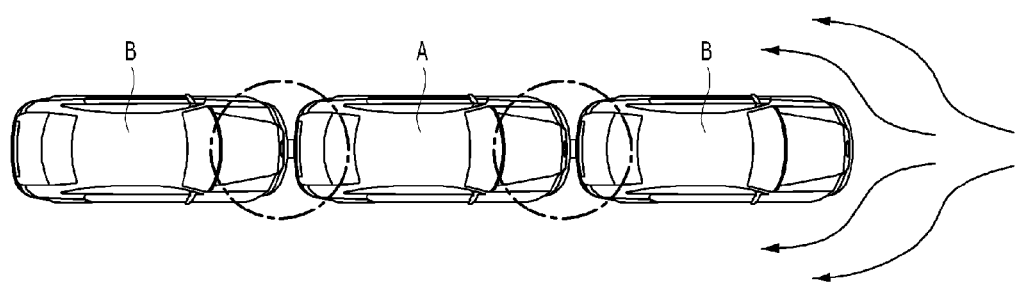
Figure 3:
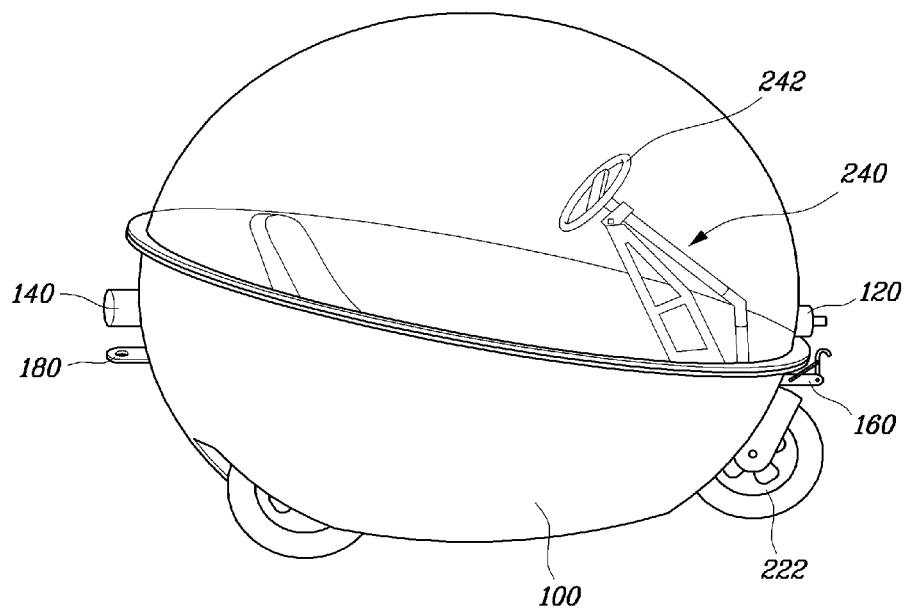
FIG. 3 is a view showing an electronic docking vehicle according to an exemplary embodiment of the present inventive concept.
Figure 4:
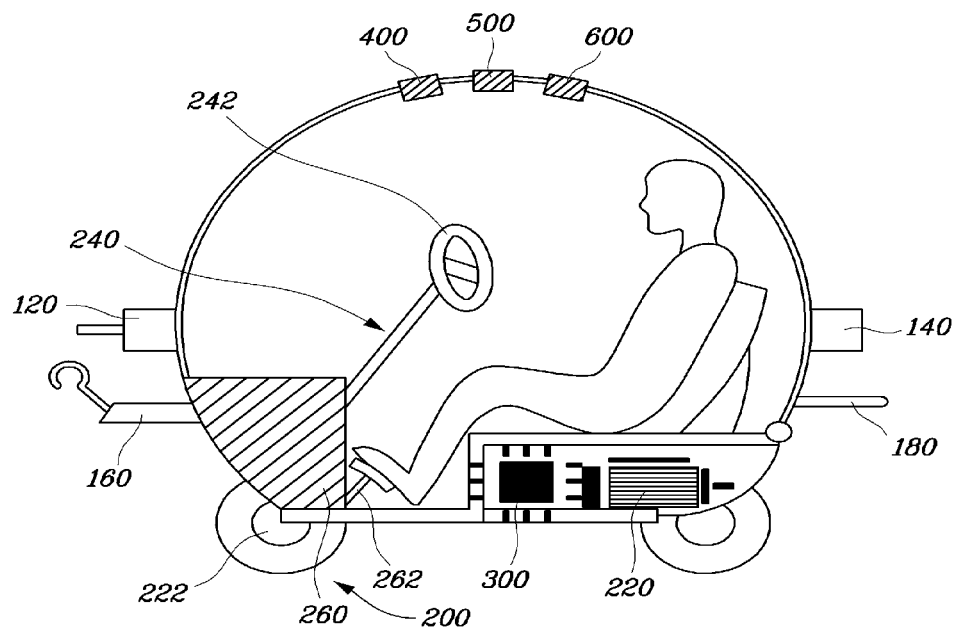
FIG. 4 is a view for describing the electronic docking vehicle shown in FIG. 3.
Figure 5:
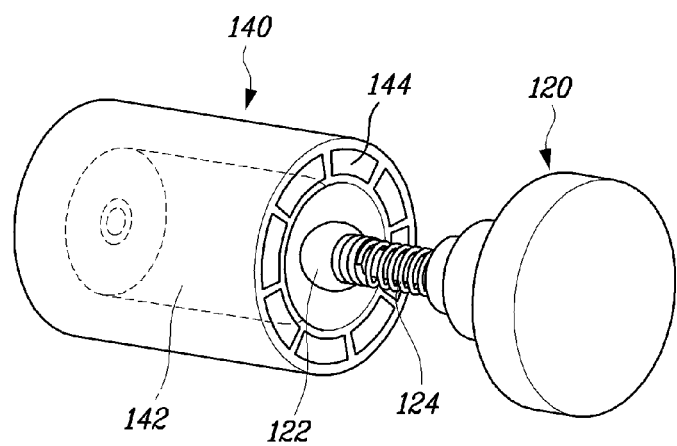
FIGS. 5 and 6 are views showing a docking subject mechanism and a docking object mechanism applied to the electronic docking vehicle shown in FIG. 3.
Figure 6:
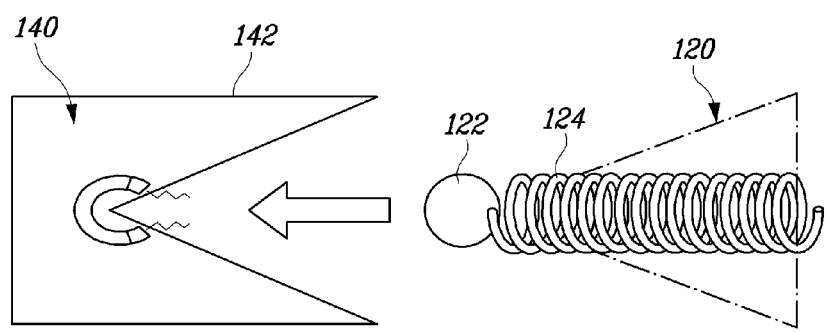
Figure 8:
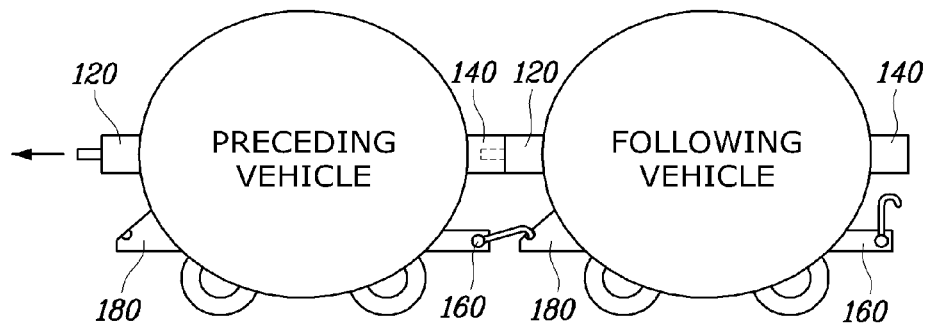
Figure 9:
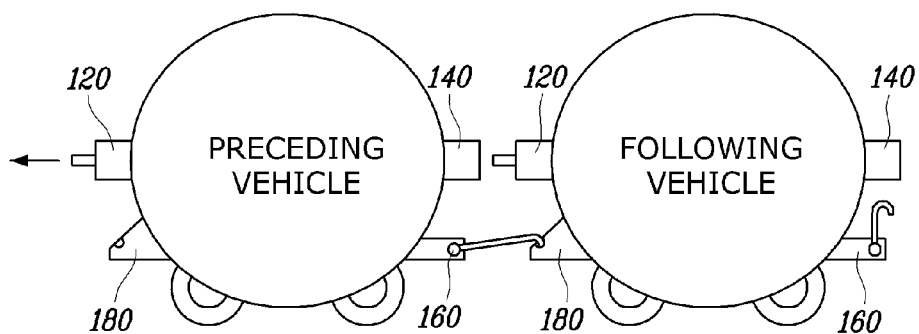
Figure 10:
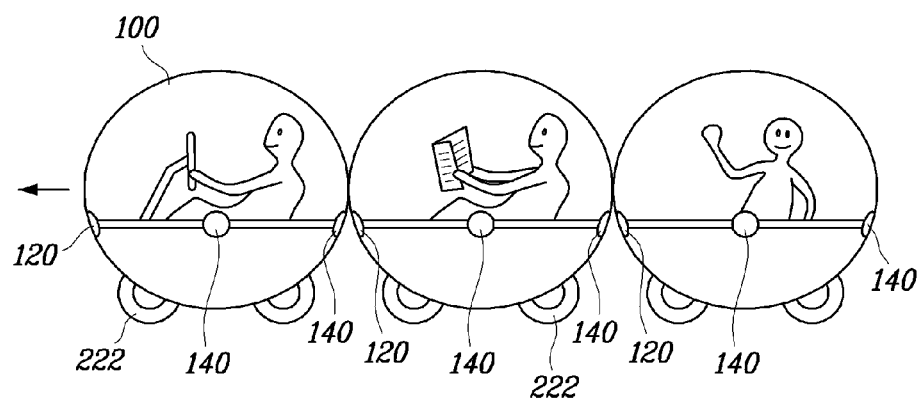
FIG. 10 is a view showing a docking state of the electronic docking vehicle shown in FIG. 3.

FIGS. 1 and 2 are views for describing a docking subject mechanism and a docking object mechanism according to an exemplary embodiment of the present inventive concept, FIG. 3 is a view showing an electronic docking vehicle according to an exemplary embodiment of the present inventive concept, FIG. 4 is a view for describing the electronic docking vehicle shown in FIG. 3, FIGS. 5 and 6 are views showing a docking subject mechanism and a docking object mechanism applied to the electronic docking vehicle shown in FIG. 3, FIGS. 7 to 9 are views for describing a docking operation of the electronic docking vehicle shown in FIG. 3, and FIG. 10 is a view showing a docking state of the electronic docking vehicle shown in FIG. 3.

The electronic docking vehicle according to an exemplary embodiment of the present inventive concept includes a vehicle body 100 having a space in which a passenger may be seated. The vehicle body 100 includes a docking subject mechanism 120 that may dock with a surrounding vehicle B and a docking object mechanism 140 with which a docking subject mechanism 120 of another surrounding vehicle B docks. A vehicle manipulating mechanism 200 is provided inside the vehicle body 100, and includes: a driving force generator 220 configured to provide a driving force to driving wheels 222; a steering manipulator 240 controlling a steering angle of the driving wheels 222; and a braking manipulator 260 generating braking force in the driving wheels 222. A controller 300 is configured to combine one vehicle A with the surrounding vehicle B through the docking subject mechanism 120 or the docking object mechanism 140, to control operation of the vehicle manipulating mechanism 200 to operate driving when the one vehicle A is a preceding vehicle, and to restrict the operation of the vehicle manipulating mechanism 200 when the one vehicle A is a following vehicle.

The electronic docking vehicle according to the exemplary embodiment of the present disclosure is configured so as to connect the one vehicle A and the surrounding vehicle B to each other using the docking subject mechanism 120 and the docking object mechanism 140. That is, the vehicle body 100 has the docking subject mechanism 120 and the docking object mechanism 140 with which a docking subject mechanism 120 of the surrounding vehicle B (hereinafter, referred to as the other vehicle B) docks, such that the one vehicle A and the other vehicle B are coupled integrally with each other at the time of coupling the docking subject mechanism 120 of the other vehicle B to the docking object mechanism 140 of the one vehicle A to thereby be driven together with each other in the same direction at the same speed. The docking subject mechanism 120 and the docking object mechanism 140 are formed of electromagnets having different electrodes, such that they may be connected to each other at the time of forming the electrodes. Alternatively, only the docking object mechanism 140 is formed of an electromagnet and the docking subject mechanism 120 is formed of a material being attracted in response to magnetic force, such that they may be connected to each other at the time of applying the magnetic force to the docking object mechanism 140.

As shown in FIG. 1, the docking subject mechanism 120 may be mounted to a front side of the vehicle body 100, and the docking object mechanism 140 may be mounted to a rear side of the vehicle body 100 to connect the one vehicle A to other vehicles B at the front and rear sides of the one vehicle A. As described above, since the docking subject mechanism 120 and the docking object mechanism 140 are mounted to the front and rear sides of the vehicle body 100, respectively, the one vehicle A and the other vehicles B are connected to each other on a straight line, as shown in FIG. 2, such that resistance to air mainly acts on only a front vehicle, thereby improving aerodynamic performance.

As described above, the vehicle body 100 is provided with the docking subject mechanism 120, the docking object mechanism 140, and the vehicle manipulating mechanism 200 which includes the driving force generator 220 providing the driving force to the driving wheels 222, the steering manipulator 240 controlling the steering angle of the driving wheels 222, and the braking manipulator 260 generating the braking force in the driving wheels 222. The driving force generator 220 described above may be an engine applied to a general vehicle, the steering manipulator 240 may be a steering device, and the braking manipulator 260 may be a brake device.

However, in the electronic docking vehicle according to the exemplary embodiment of the present disclosure, which is applied to a single-seater vehicle, the driving force generator 220 may be an electric motor to rotate the driving wheels 222 by a driving force of the motor. That is, the electronic docking vehicle according to the present disclosure may be an electric vehicle is powered by a battery to drive the motor and to rotate the driving wheels 222 by the driving force of the motor.

In addition, the steering manipulator 240 may include a steering manipulating mechanism 242 provided inside the vehicle body 100 for a driver to directly manipulate the steering angle of the driving wheels 222. The braking manipulator 260 may include a braking manipulating mechanism 262 connected to the steering manipulating mechanism 242 and allowing the braking force to be generated by manipulation of the driver.

The steering manipulating mechanism 242 may use a steering wheel scheme applied to a general vehicle, and the braking manipulating mechanism 262 may allow brakes provided in the driving wheels 222 to interwork with the steering manipulating mechanism 242 to generate the braking force. Generally, mechanisms for steering and braking of the vehicle are necessarily installed in the vehicle and are applied in various forms. Therefore, the steering manipulating mechanism 242 and the braking manipulating mechanism 262 may be applied in various forms.

Therefore, when an individual vehicle is driven by the driving force of the electric motor, and a driver may directly manipulate the steering manipulating mechanism 242 and the braking manipulating mechanism 262 to drive the vehicle to a desired destination.

As described above, when a single-seater electric vehicle is used, weight of the vehicle is decreased. Therefore, even though the vehicle combines with the other vehicles B, an influence due to the weight is minimized, thereby making it possible to allow the vehicles to smoothly travel. In addition, all of the respective vehicles may be individually driven to freely move to desired destinations.

The vehicles including the docking subject mechanism 120 and the docking object mechanism 140 are connected to each other depending on a control of the controller 300. The controller 300 controls the operation of the vehicle manipulating mechanism 200 to allow the one vehicle A to be driven while pulling the following vehicle when the one vehicle A is the preceding vehicle and limits the operation of the vehicle manipulating mechanism 200 to allow the one vehicle A to be pulled by the preceding vehicle when the one vehicle A is the following vehicle, in a state in which the one vehicle A and the other vehicle B combine with each other through the docking subject mechanism 120 and the docking object mechanism 140.

That is, since the one vehicle A should move the following vehicle to the destination in the case in which the one vehicle A is the preceding vehicle, the controller 300 allows the operation of the vehicle manipulating mechanism 200 to perform driving. The controller 300 limits the operation of the vehicle manipulating mechanism 200 in the case in which the one vehicle A is the following vehicle and the one vehicle A hinders driving of the preceding vehicle when the vehicle manipulating mechanism 200 is operated as the one vehicle A is connected to the preceding vehicle since the one vehicle A should be pulled by the preceding vehicle.

Since a plurality of vehicles driven to the same destination are connected integrally with each other, the vehicles may be safely driven toward the destination.

The present disclosure will be described in more detail. The vehicle body 100 according to the exemplary embodiment of the present inventive concept has a spherical shape, and may include a plurality of docking subject mechanisms 120 and docking object mechanisms 140 installed along an outer circumference thereof so as to be spaced apart from each other.

Referring to FIGS. 3 and 4, the vehicle body 100 having the spherical shape includes the docking subject mechanisms 120 and the docking object mechanisms 140 along the outer circumference of the vehicle body 100 so as to be spaced apart from each other, thereby stably combining the surrounding vehicles B with the front and the rear sides and/or left and right sides of the vehicle body 100.

According to the present disclosure, the vehicle may be the single-seater vehicle, and the vehicle body 100 has the spherical shape, thereby providing a comfort space to the passenger getting in the vehicle body 100 and decreasing the total weight of the vehicle. In addition, the plurality of docking subject mechanisms 120 and docking object mechanisms 140 are installed along the outer circumference of the vehicle body 100 so as to be spaced apart from each other, such that the surrounding vehicles B may freely combine at the front and rear sides and/or the left and right sides of the vehicle body 100 along the outer circumference of the vehicle body 100. Further, the vehicles having the spherical shape are connected to each other on a straight line as in a pea shape, thus providing an aesthetic effect.

The docking subject mechanisms 120 and the docking object mechanisms 140 may be installed at opposite sides of the vehicle body 100, respectively. As an example, the docking subject mechanism 120 may be installed at the front side of the vehicle body 100, the docking object mechanism 140 may be installed at the rear side of the vehicle body 100, or the docking subject mechanism 120 and the docking object mechanism 140 may be installed at the left and right sides of the vehicle body 100, such that when the vehicles combine with each other in a longitudinal direction, they may combine with each other by connecting the docking subject mechanism 120 installed at the front side of the other vehicle B to the docking object mechanism 140 installed at the rear side of the one vehicle A. Similarly, the one vehicle A may combine with the other vehicles B at the left and right sides thereof as well as the front and rear sides thereof, such that the vehicles may combine with each other in various directions.

Referring to FIGS. 5 and 6, the docking object mechanism 140 may be formed of an electromagnet which receives power to generate the magnetic force. The docking subject mechanism 120 may include a mover 122 which moves toward the docking object mechanism 140 when the magnetic force is generated in the docking object mechanism 140 and a connecting coil 124 which connects the moving member 122 and the vehicle body 100 and is elastically deformable.

That is, the docking object mechanism 140 may be formed of the electromagnet, and may be provided in a cylindrical housing 142 installed in the vehicle body 100, as shown in FIG. 5. The mover 122 of the docking subject mechanism 120 is pulled by the magnetic force when the magnetic force is generated in the docking object mechanism 140 to thereby move, and the connecting coil 124 connects the mover 122 to the vehicle body 100.

Referring to FIG. 6, when power is applied to the docking object mechanism 140 to generate the magnetic force, the mover 122 of the docking subject mechanism 120 is pulled by the magnetic force, such that the docking object mechanism 140 and the docking subject mechanism 120 are connected to each other. The mover 122 may be an iron ball reacting to the magnetic force, and the connecting coil 124, which is fixed to the mover 122 and the vehicle body 100, is elastically deformed, such that even though the preceding vehicle and the following vehicle are spaced apart from each other, the connecting coil 124 elastically extends, thereby maintaining a connection state of the moving member 122 and the docking object mechanism 140.

The vehicle body 100 may have a hook 160 disposed at an upper side or a lower side of the docking object mechanism 140 and rotate in a vertical direction depending on a control of the controller 300. A connector 180 is disposed at an upper side or a lower side of the docking subject mechanism 120 and connected with a hook 160 of the surrounding vehicle B.

Thus, when the docking subject mechanism 120 and the docking object mechanism 140 are connected to each other, the hook 160 and the connector 180 are connected to each other, such that the preceding vehicle and the following vehicle are physically connected to each other.

The hook 160 is provided at the lower side of the docking object mechanism 140, rotates vertically depending on the control of the controller 300, and may have a hook shape. The connector 180 may be provided at the lower side of the docking subject mechanism 120 and have a ring shape so that the hook 160 having the hook shape is hooked and connected thereto. As described above, in the case in which the hook 160 having the hook shape and the connector 180 having the ring shape are connected to each other, even though the connection between the docking subject mechanism 120 and the docking object mechanism 140 is released, a physical connection state between the docking subject mechanism 120 and the docking object mechanism 140 is maintained, such that the preceding vehicle and the following vehicle may be driven as being connected to each other without applying a power to the docking object mechanism 140. That is, the vehicles may be connected to each other as connecting a trailer.

Figure 7:
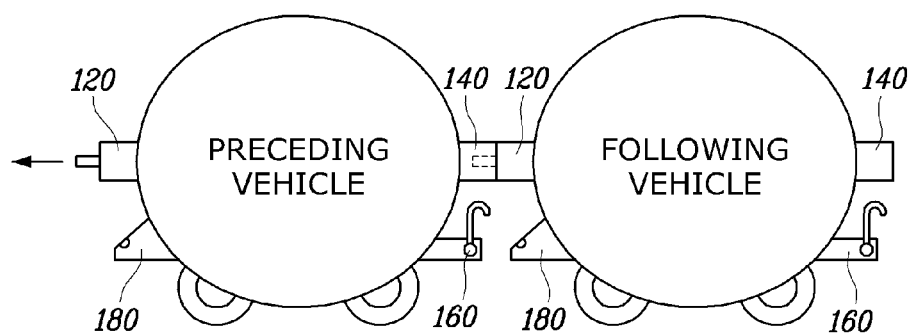
FIGS. 7 to 9 are views for describing a docking operation of the electronic docking vehicle shown in FIG. 3.

As shown in FIG. 7, in the case in which the preceding vehicle and the following vehicle are combined with each other, the power is applied to the docking object mechanism 140 installed at the rear of the preceding vehicle to connect the docking subject mechanism 120 installed at the front of the following vehicle to the docking object mechanism 140.

As described above, when the preceding vehicle and the following vehicle combine with each other through the docking subject mechanism 120 and the docking object mechanism 140, as shown in FIG. 8, the hook 160 installed in the preceding vehicle rotates to be hooked and connected to the connector 180 installed in the following vehicle to physically connect the preceding vehicle and the following vehicle to each other.

Then, referring to FIG. 9, the power applied to the docking object mechanism 140 is blocked, such that the docking subject mechanism 120 and the docking object mechanism 140 are disconnected from each other, but the hook 160 and the connector 180 are maintained in a state in which they are connected to each other, thereby maintaining the connection between the preceding vehicle and the following vehicle without applying power.

Therefore, power consumption may be prevented as the preceding vehicle and the following vehicle are physically combined with each other, thereby preventing an accident due to an electrical error.

The vehicle body 100 may further have a damper 144 formed at peripheral edges of the docking subject mechanism 120 and the docking object mechanism 140 in order to absorb impact. As described above, the damper 144 is provided on the vehicle body 100 to absorb impact due to the contact between the one vehicle A and the other vehicle B at the time of combination between the one vehicle A and the other vehicle B, thus preventing damage.

The electronic docking vehicle according to the present disclosure further includes a sensor 400 installed in the vehicle body 100 and collecting driving information on driving speeds of the surrounding vehicles B and a distance between the vehicles. When the distance between the one vehicle A and the following vehicle arrives at a pre-stored combination enabled distance at the time of combination between the one vehicle A and the following vehicle in a state in which the one vehicle A is the preceding vehicle, the controller 300 receiving vehicle information through the sensor 400 applies the magnetic force to the docking subject mechanism 120 or the docking object mechanism 140 to allow the one vehicle A to combine with the following vehicle.

The sensor 400 may be one of an infrared sensor, an object recognizing camera, an optical sensor, an ultrasonic sensor, and a radio frequency (RF) sensor, and may collect information on the driving speeds of the vehicles and the distance between the vehicles and transmit corresponding data to the controller 300. The controller 300 receiving the driving data of the surrounding vehicle B as described above determines whether the one vehicle A is the preceding vehicle or the following vehicle as compared with the surrounding vehicle B and determines whether the distance between the one vehicle A and the following vehicle arrives at the pre-stored combination enabled distance in the case in which the one vehicle A is the preceding vehicle.

Here, the combination enabled distance, which is a distance at which the docking object mechanism 140 of the one vehicle A corresponding to the preceding vehicle and the docking subject mechanism 120 of the following vehicle may be connected to each other, is a distance set so that the magnetic force of the docking object mechanism 140 may act on the docking subject mechanism 120.

When the distance between the one vehicle A and the following vehicle arrives at the combination enabled distance, the magnetic force is applied to the docking object mechanism 140 to allow the docking subject mechanism 120 of the following vehicle to be connected to the docking object mechanism 140, thereby combining the one vehicle with the following vehicle.

Particularly, in the case in which the one vehicle A is the preceding vehicle, the controller 300 allows a driving speed to be maintained at a predetermined speed until the combination between the one vehicle and the following vehicle is performed, thus maintaining a stable speed of the following vehicle and smoothly combining with the preceding vehicle.

On the other hand, in the case in which the distance between the one vehicle A and the preceding vehicle does not arrive at the pre-stored combination enabled distance at the time of combination between the one vehicle A and the preceding vehicle in a state in which the one vehicle A is the following vehicle, the controller 300 increases the driving speed, thereby making it possible to allow the distance between the one vehicle A and the preceding vehicle to arrive at the combination enabled distance.

That is, since the one vehicle A, which is the following vehicle, should be as close as possible to the preceding vehicle in order to combine with the preceding vehicle, in the case in which the distance between the one vehicle A, which is the following vehicle, and the preceding vehicle does not arrive at the combination enabled distance, the driving speed is increased to allow the distance between the one vehicle A and the preceding vehicle to arrive at the combination enabled distance. Here, in the case of increasing the driving speed of the following vehicle, the driving speed of the following vehicle is slowly increased at a speed lower than that of the preceding vehicle by 1 km/h to allow the following vehicle to stably approach the preceding vehicle, thereby making it possible to allow a combination operation to be performed.

The electronic docking vehicle according to the present disclosure further includes a position information collector 500 transmitting and receiving position information of an artificial satellite. A radio frequency (RF) transceiver 600 wirelessly communicates with the surrounding vehicles B positioned within a communication area. The controller 300 may search a vehicle with which the one vehicle A is to combine among the surrounding vehicles and perform combination with the surrounding vehicle B when a combination command with the corresponding vehicle is input.

For the position information collector 500, a cellular phone terminal of the passenger or various apparatuses transmitting and receiving the position information of the artificial satellite may be used. The cellular phone terminal, which is the position information collector 500, searches the other vehicle B close to a position at which the one vehicle A is currently positioned through an application and determines a destination of the other vehicle B and whether or not the other vehicle B agrees to travel together with the one vehicle.

When the other vehicle B having the same destination agrees and inputs a command to travel together with the one vehicle A, the one vehicle A and the other vehicle B join and move together. In addition, a control of the following vehicle for the preceding vehicle after the combination between the one vehicle A and the other vehicle B may be performed through the RF transceiver 600.

When the one vehicle A and the surrounding vehicle B combine with each other, the controller 300 controls the vehicle manipulating mechanisms 200 of the one vehicle A and the surrounding vehicle B to uniformly distribute the driving force of the driving force generators 220 and to uniformly generate the braking force of the braking manipulators 260.

The vehicle may be driven by only driving force of the preceding vehicle after the one vehicle A combines with the surrounding vehicle B. However, when the preceding vehicle is driven while pulling the following vehicle, a load of the preceding vehicle is increased.

In the case in which the one vehicle A and the surrounding vehicle B combine with each other, the vehicle manipulating mechanisms 200 of all the vehicles are controlled to uniformly distribute the driving force of the driving force generators 220 and to uniformly generate the braking force of the braking manipulators 260. In this case, since the vehicle manipulating mechanisms 200 of all the vehicles are controlled by the preceding vehicle, the steering manipulators 240 of the vehicle manipulating mechanisms 200 may be manipulated by only the preceding vehicle, and the driving force generators 220 and the braking manipulators 260 may be similarly operated depending on a command of the preceding vehicle.

Therefore, when the one vehicle A is driven in a state in which it combines with the other vehicle B, the driving wheels 222 of four or more are secured, such that the vehicles may be stably driven even on a sloping road or a slippery road.

When the following vehicle is separated from the preceding vehicle and is separately driven, the vehicle manipulating mechanism 200 may be manipulated once the following vehicle is completely separated from the preceding vehicle, thereby preventing an accident and allowing the vehicles to be smoothly driven.

The electronic docking vehicle as described above physically connects vehicles to each other, which travels in the same direction to the same destination, thereby decreasing fuel consumption.

In addition, an integral driving system in which the respective vehicles are connected to each other allows the vehicles to smoothly dock with each other, and the vehicles moving toward the same destination are searched through communication with the surrounding vehicles to allow a plurality of vehicles to move in a state in which they are connected integrally with each other. Thus, convenience of drivers is improved with security as compared with a case in which each of the drivers drives separately.

Although the present inventive concept has been shown and described with respect to specific exemplary embodiments, it will be obvious to those skilled in the art that the present inventive concept may be variously modified and altered without departing from the spirit and scope of the present disclosure as defined by the following claims.

What is claimed is:

1. An electronic docking vehicle comprising:
    a vehicle body having a space therein in which a driver is seated, the vehicle body including a docking subject device that docks with a first surrounding vehicle and a docking object device with which a docking subject device of a second surrounding vehicle docks;
    a vehicle manipulating device provided in the vehicle body, the vehicle manipulating device including a driving force generator providing a driving force to driving wheels, a steering manipulator controlling a steering angle of the driving wheels, and a braking manipulator generating a braking force in the driving wheels; and
    a controller configured to perform combination of one vehicle and the surrounding vehicles through the docking subject device or the docking object device, and to control an operation of the vehicle manipulating device to perform vehicle driving when the one vehicle is a preceding vehicle and to limit the operation when the one vehicle is a following vehicle,
    wherein the vehicle body further includes:
    a hook disposed at a front side or a rear side of the first surrounding vehicle and rotating in a vertical direction according to a control of the controller; and
    a connector disposed at a front side or a rear side of the second surrounding vehicle, opposite to a position of the hook in the first surrounding vehicle, to be connected with the hook of the first surrounding vehicle.

2. The electronic docking vehicle of claim 1, wherein the vehicle body has a spherical shape and includes a plurality of docking subject mechanism devices and a plurality of docking object mechanism devices spaced apart from each other along an outer circumference thereof.

3. The electronic docking vehicle of claim 1, wherein the docking subject device is mounted to a front side of the vehicle body, and the docking object device is mounted to a rear side of the vehicle body.

4. The electronic docking vehicle of claim 1, wherein the docking object device includes an electromagnet which receives power to generate a magnetic force, and
    the docking subject device includes a mover moving toward the docking object device when the magnetic force is generated in the docking object device and a connecting coil connecting the mover to the vehicle body as being elastically deformed.

5. The electronic docking vehicle of claim 1, wherein the vehicle body further includes:
    a damper provided at peripheries of the docking subject device and the docking object device to absorb impact.

6. The electronic docking vehicle of claim 1, wherein the driving force generator of the vehicle manipulating device is an electric motor generating the driving force to rotate the driving wheels.

7. The electronic docking vehicle of claim 1, wherein the steering manipulator of the vehicle manipulating device includes a steering manipulating device disposed in the space of the vehicle body to allow the driver to directly manipulate the steering angle of the driving wheels, and the braking manipulator of the vehicle manipulating device includes a braking manipulating device connected to the steering manipulating device and generating the braking force by manipulation of the driver.

8. The electronic docking vehicle of claim 1, further comprising:
a sensor mounted to the vehicle body and collecting driving information on driving speeds of the surrounding vehicles and distances between the one vehicle and the surrounding vehicles,
wherein when a distance between the one vehicle and the second surrounding vehicle reaches a pre-stored combination enabled distance to combine the one vehicle with the second surrounding vehicle in which the one vehicle is the preceding vehicle, the controller receives vehicle information through the sensor and applies a magnetic force to the docking subject device or the docking object device to allow the one vehicle to combine with the second surrounding vehicle.

9. The electronic docking vehicle of claim 8, wherein the controller controls to maintain the one vehicle at a predetermined driving speed until the one vehicle and the second surrounding vehicle are combined.

10. The electronic docking vehicle of claim 8, wherein when a distance between the one vehicle and the first surrounding vehicle does not reach the combination enabled distance to combine the one vehicle and the first surrounding vehicle in which the one vehicle is the following vehicle, the controller increases a driving speed of the one vehicle, thereby allowing the distance between the one vehicle and the first surrounding vehicle to reach the combination enabled distance.

11. The electronic docking vehicle of claim 1, further comprising:
a position information collector transmitting and receiving position information to and from an artificial satellite; and
a radio frequency (RF) transceiver wirelessly communicating with the surrounding vehicles positioned within a communication area,
wherein the controller searches a vehicle with which the one vehicle is to combine among the surrounding vehicles and combines the one vehicle with the vehicle when a combination command from the corresponding vehicle is input to the controller.

12. The electronic docking vehicle of claim 11, wherein the position information collector is a cellular phone terminal and determines destinations of the surrounding vehicles and whether or not the surrounding vehicles agree to travel together with the one vehicle.

13. The electronic docking vehicle of claim 1, wherein when the one vehicle combines with the surrounding vehicles, the controller controls the vehicle manipulating devices of the one vehicle and the surrounding vehicles to uniformly distribute the driving force and uniformly generate the braking force for the one vehicle and the surrounding vehicles.

* * * * *